United States Patent

[11] 3,580,668

[72] Inventor Hermann Claar
 Stuttgart-Hedelfingen, Germany
[21] Appl. No. 765,112
[22] Filed Oct. 4, 1968
[45] Patented May 25, 1971
[73] Assignee Eastman Kodak Company
 Rochester, N.Y.
[32] Priority Oct. 7, 1967
[33] Germany
[31] K59048

[54] CONTROL MECHANISM FOR MOTION PICTURE PROJECTOR
 3 Claims, 6 Drawing Figs.

[52] U.S. Cl. .................................................. 352/194,
 352/169, 352/173, 352/180
[51] Int. Cl. .................................................. G03b 21/12,
 G03b 1/22

[50] Field of Search ........................................... 352/194,
 191, 173, 169, 180

[56] References Cited
 UNITED STATES PATENTS

| | | | |
|---|---|---|---|
| 3,261,654 | 7/1966 | Faber et al. ................. | 352/194 |
| 3,402,007 | 9/1968 | Gerlach ........................ | 352/194X |
| 3,471,227 | 10/1969 | McClellan et al. ............ | 352/173X |

Primary Examiner—Louis R. Prince
Assistant Examiner—Joseph W. Roskos
Attorneys—Robert W. Hampton and J. Addison Mathews ABSTRACT: A driving arrangement for the film claw of a motion picture projector comprises a plurality of radial cams which rotate in synchronism on a common axis to selectively effect various modes of up-and-down and in-and-out movement of the claw.

HERMANN CLAAR
INVENTOR.

BY J. Addison Matthews
Robert W. Hampton
ATTORNEYS

CONTROL MECHANISM FOR MOTION PICTURE PROJECTOR

BACKGROUND OF THE INVENTION

This invention relates to web handling apparatus, and more particularly to a mechanism for controlling a film claw in a motion picture projector.

It is known in the motion picture art to advance perforated film through a projection gate of a motion picture projector by a film claw having drive means operatively engaging the claw to effect movement of the claw "up-and-down" parallel to the film advancing direction and "in-and-out" perpendicular to the film advancing direction. The up-and-down movement of the claw effects movement of the film through the gate, while the in-and-out movement of the claw causes the film engaging portion of the claw to enter or retract from the perforations in the film during drive and return strokes of the claw, respectively.

It is also known to employ various types of cam arrangements to effect the up-and-down and in-and-out movement of the film claw. For example, in one known type of claw control mechanism an eccentric or radial cam is provided for controlling movement of the claw in a film feeding direction, and an axial or face cam is provided for controlling movement of the claw in a film engaging direction. Moreover, it is known in such arrangements to mount the radial and face cams on a common axis or shaft, and in some cases the radial and eccentric cams are defined by a single member. While these previously known mechanisms are satisfactory for their intended purpose, they are expensive to manufacture, particularly in view of the accuracy required to manufacture a satisfactory face cam and to synchronize the face cam with the radial cam. Moreover, with these structures, it is often necessary to stop or reverse the direction of rotation of the drive motor in order to change the direction of film movement from forward to reverse projection. This, of course, is inconvenient and time consuming.

In another known arrangement a claw control mechanism is provided with two eccentric cams, one controlling movement of the claw in the film feeding direction and the other controlling movement of the claw in the film engaging direction. However, with such arrangements additional mechanisms are required to reverse the direction of film movement for reverse projection or to arrest the film movement for still projection. Further, with this type of arrangement, the axis of the engagement control cam extends generally parallel to the plane of the film, taking up an undesirable amount of space in this direction.

In still another arrangement movement of the film during forward, reverse and still projection is controlled entirely by radial cams. However, in this arrangement the cam for controlling the film feed and the cams for controlling claw engagement are mounted on separate axes. Again, the axis of the engagement-control cams extend substantially parallel to the plane of the film taking up an undesirable amount of space in this direction. Further, the advance control cam requires additional operating mechanisms mounted on a shaft completely separate from that of the engagement-control cam which must be synchronized with the engagement-control cam. Thus, this arrangement is particularly complex and is difficult to make compact.

SUMMARY OF THE INVENTION

It is an object of the present invention to provide a compact control mechanism for a web advancing claw in which the selection of different modes of operation of the claw is vastly simplified and can be effected without stopping or reversing the claw drive motor.

It is another object of this invention to provide an improved film claw control mechanism for a motion picture projector including drive means for pivoting the film claw about an axis for engagement and disengagement with the film and for moving the film claw parallel to this axis to advance the film through the projector.

According to the invention, up-and-down movements of a film claw, which effect film advance, as well as in-and-out movements of the claw, which effect engagement and disengagement between the claw and the film, are controlled by rotatable drive means, for example, eccentric or radial cams seated on a common shaft or parallel shafts extending perpendicular to the direction of film advance.

According to a preferred embodiment of the invention, the control mechanism includes a claw lever having two followers. One follower is arranged in permanent sliding engagement with a film advancing cam to transmit up-and-down movement to the film claw parallel to the film advancing direction. The other follower is displaceable to selectively engage any one of a plurality of in-and-out cams to transmit movement to the claw perpendicular to the film advancing direction, said movement being in a selected one of a plurality of cycles or modes depending on the cam selected to effect the movement. The up-and-down cam and each of the in-and-out cams are all mounted on a common shaft which is arranged perpendicular to the direction of film advance through the projector, thus providing a compact and simplified control mechanism for the claw.

Other objects and the attendant advantages of the present invention will become apparent from the detailed description to follow together with the accompanying drawings.

DESCRIPTION OF THE PREFERRED EMBODIMENT

Figure 1:
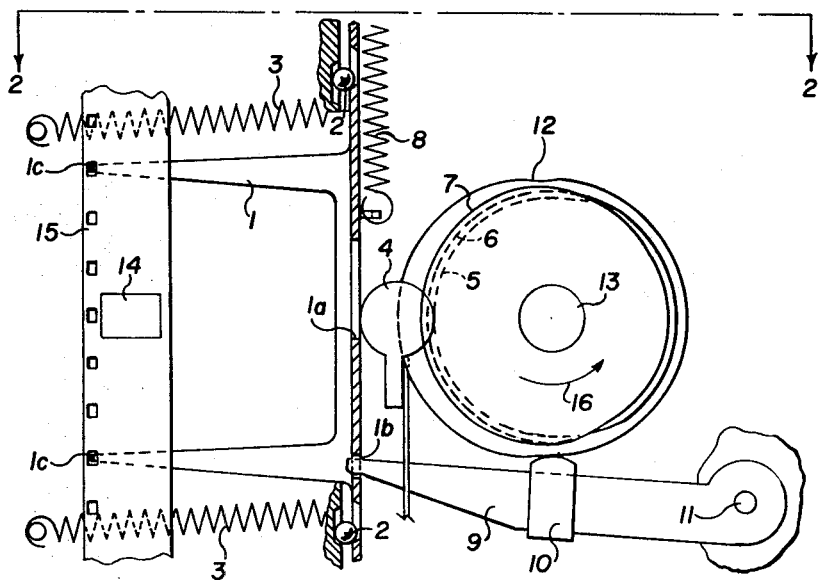
FIG. 1 is a front elevational view of the control mechanism according to the present invention.
Figure 2:
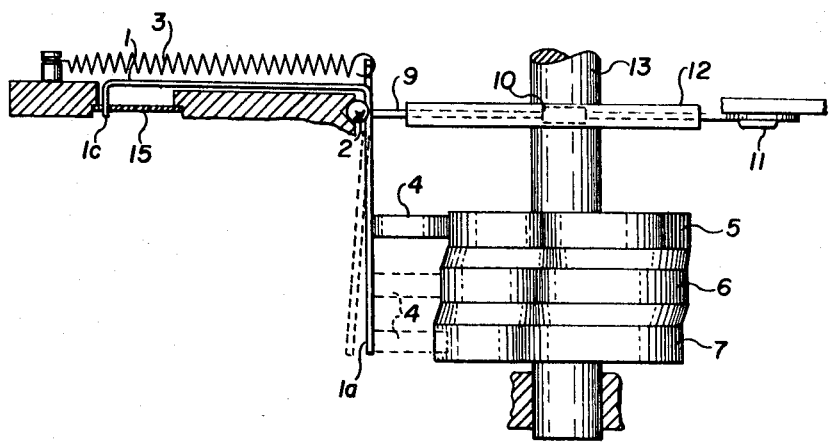
FIG. 2 is a top plan view of the control mechanism according to FIG. 1.

Referring now to the drawings wherein like numerals are employed to indicate like parts throughout, there is shown a film claw 1 having two arms terminating at film engaging portions or lugs 1c which are adapted to engage the film 15 and to enter perforations therein for moving the film in an advancing direction (vertically as viewed in FIG. 1) past a film projection gate indicated diagrammatically at 14. As best illustrated in FIG. 2, the film claw includes a control member disclosed as a lever or lug 1a extending generally perpendicular to the plane of the two arms of the film claw 1.

The film claw is urged against a set of rolling balls 2 by the action of tension spring 3. So mounted, the film claw is capable of pivotable movement about a line or pivot axis connecting the rolling elements 2; and it is also capable of vertical movement (as viewed in FIG. 1) in a direction parallel to the line or pivot axis.

Pivotal movement of the film claw 1 about the pivot axis causes engagement and disengagement of the lugs 1c with the perforations in the film 15. To effect this pivotable movement, there is provided a plurality of radial cams 5, 6, and 7 all mounted on a common shaft 13. A sliding member 4 located between the cams and the control lug 1a is capable of sliding movement back and forth in a direction parallel to the axis of shaft 13 thereby operatively coupling a selected one of said cams 5, 6, or 7 to the control lug 1a. The means for moving the sliding member 4 is known per se and will not be shown in further detail herein.

Also mounted on the shaft 13 is an eccentric or radial film advance cam 12 for acting upon the cam follower 10 connected to the claw lever 9 and hence oscillating the claw lever about pivot stud 11. This claw lever is in turn slidingly engaged in the film claw 1 in groove or slot 1b. The follower 9 is continuously urged against the cam 12 by the upward force exerted by the spring 8 upon the film claw 1.

The contour of each of the control cams 5, 6 and 7 is so chosen, relative to the contour of film advance cam 12, that each provides a different mode of operation of the motion picture projector. In particular, and in manner to be described in greater detail below, the control cam 5 causes forward movement of the film 15, the control cam 7 causes reverse movement of the film 15 and the central control cam 6 completely disengages the film claw lugs 1c from the film thereby causing the film to remain stationary. Thus, by simply moving the sliding member 4 in a direction parallel to the axis of shaft 13, it is possible to select any one of a plurality of modes of operation of the projector without stopping, disengaging or reversing the projector drive motor. The control cams 5, 6 and 7 may be constructed separately or they may be constructed as one integral unit. Further, shaft 13 may serve also as the diaphragm and shutter shaft.

The various modes of operation will now be explained with reference to the drawings.

Figure 3:
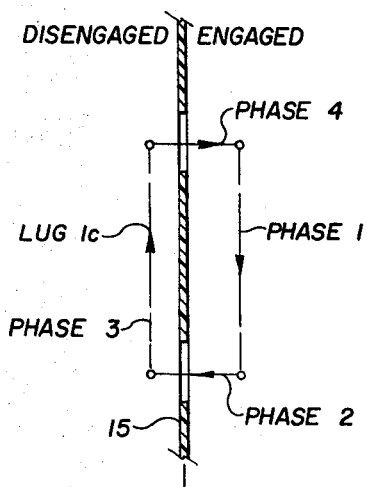
FIG. 3 through 6 illustrate in schematic form the various phases of the claw movements when the film is fed in the forward and reverse direction.

FIG. 3 illustrates the movement of the lug 1c during the forward mode of operation. In phase 1 the high point of cam 12 is approaching follower 10 thereby urging the lever 9 and hence the film claw 1 downwardly. Concurrently, a low, concentric portion of cam 5 engages the sliding member 4 so that the film claw 1 does not pivot around the said pivot axis and hence the lugs 1c remain engaged in the perforations in the film 15 by the action of spring 3 acting upon the film claw 1. During the second phase a concentric portion of cam 12 engages the follower 10 so that there is no vertical movement of film claw 1. Concurrently a high point of cam 5 engages the sliding member 4 thereby urging the lug 1a to the left and thus urging the lug 1c out of engagement with the film 15. Next, during phase 3 the portion of cam 12 in engagement with the follower 10 descends to a low point thereby permitting upward movement of the lever 9 under the action of spring 8 thereby raising the film claw 1. Concurrently, a high concentric portion of cam 5 engages the sliding member 4 thereby continuously urging the lug 1a to the left and hence continuously urging the lug 1c out of engagement with the film 15 during this upward movement with the film claw 1. Finally, during the fourth phase a concentric portion of cam 12 engages follower 10 so that there is no vertical movement of the lever 9 or the film claw 1. Concurrently, the portion of cam surface 5 in engagement with sliding member 4 descends to a low point thereby permitting the lug 1a to move to the right and to permit the lug 1c to move into engagement with the film 15.

The control cam 6 is concentric about the axis 13 and has a sufficiently large outer radius so that when sliding member 4 is positioned between the control cam 6 and the lug 1a, the lug 1a is continuously urged to the left so that lug 1c is continuously urged out of engagement with the film 15. This, of course, provides for the still projection mode of operation.

Finally, the control gear 7 is arranged to cooperate with the cam 12 in a manner diametrically opposed to that of control cam 5 thereby providing reverse movement of the film.

Figure 4:
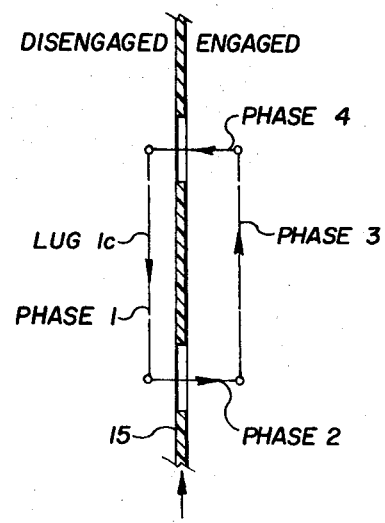

Referring to FIG. 4, during the first phase of operation, the high point of cam 12 engages the cam follower 10 thereby lowering the lever 9 and the film claw 1. Concurrently, a high concentric portion of control cam 7 engages the sliding member 4 to urge the lug 1a to the left so that the lugs 1c move downwardly behind the film, disengaged therefrom. During phase 2 a concentric portion of cam 12 engages the follower 10 so that there is no upward or downward movement of the lever 9 or the film claw 1. Currently, the low point of cam 7 comes into engagement with sliding member 4 thereby releasing the lug 1a and permitting the lugs 1c to engage the film.

During phase 3 the low portion of cam 12 moves into engagement with follower 10 thereby permitting the lever 9 and the film claw 1 to rise under the influence of spring 8. Concurrently, a concentric low portion of cam 7 engages the sliding member 4 so that the lug 1a remains in its rightmost position and the lugs 1c engage the film to move it upwardly. In the present embodiment this would constitute reverse movement of the film. Finally during phase 4 a concentric portion of cam 12 engages the follower 10 so that there is no vertical movement of the lever 9 or the film claw 1. Concurrently, the high portion of cam 7 comes into engagement with sliding member 4 thereby causing disengagement of the lugs 1c of the film claw 1 from the perforations in the film 15.

Figure 5:
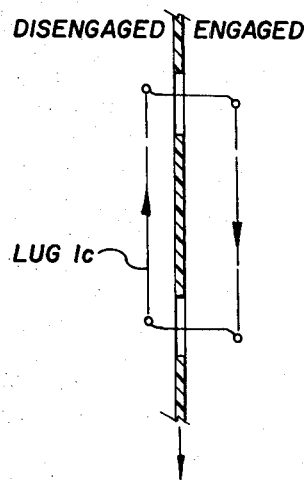
Figure 6:
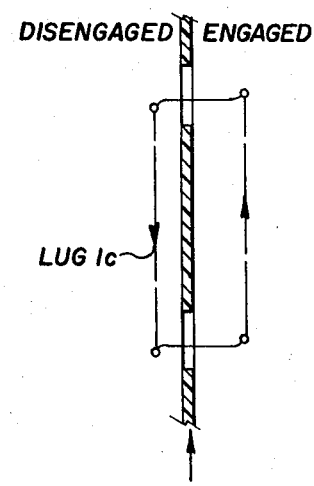

In order to prevent injury to the film and to the lugs 1c, it is expedient to design the contour of the cam 12 such that it provides for an advance and a subsequent stroke, so that the film claw lugs 1c touch the edge of the perforations slowly, and then advance the film 15 rapidly and afterwards rise somewhat from the edge of the perforations. These advance and subsequent strokes may overlap with the pivotal movements caused by cams 5 and 7 so that in the forward mode the movements performed by the lugs 1c of the film claw correspond to those shown in the diagram of FIG. 5 and so that in the reverse mode the movements performed by the lugs 1c of the film claw correspond to those shown in the diagram of FIG. 6.

The invention has been described in detail with particular reference to preferred embodiments thereof, but it will be understood that variations and modifications can be effected within the spirit and scope of the invention.

I claim:

1. In a motion picture projector of the tube having an aperture film gate past which film is adapted to advance for projection of successive images, the combination comprising:
   a. a rotatable shaft defining a first axis which is substantially perpendicular to the direction of film advance;
   b. a plurality of in-out radial film engaging cams, mounted on said shaft, each said in-out radial cam corresponding to a different mode of operation of the projector;
   c. an up-and-down cam mounted on said shaft;
   d. claw means for engaging and advancing the film and defining a second axis substantially parallel to the direction of film advance;
   e. means coupling said up-and-down radial cam to said claw means to move said claw means linearly relative to said second axis; and
   f. means for selectively coupling one of said in-out cams to said claw means to effect in-out movement of said claw means according to a mode of operation corresponding to said selected in-out cam.

2. The invention as set forth in claim 1 wherein said plurality of in-out cams comprises a first cam shaped to operate in synchronism with said up-down cam to effect reverse movement of film past the film gate, a second cam shaped to operate in synchronism with said up-down cam to effect forward movement of the film past the film gate, and a third cam interposed between said first and second cams on said shaft and shaped to prevent movement of the film past the film gate.

3. The invention as set forth in claim 2 including a plurality of rolling elements located on said second axis, and spring means urging said claw means against said rolling elements; said claw means being adapted to execute in-out movement by pivoting about said rolling elements and execute up-down linear movement along said second axis.